United States Patent
Gard et al.

(12)

(10) Patent No.: US 6,438,748 B1
(45) Date of Patent: Aug. 20, 2002

(54) APPARATUS AND METHOD FOR CONVERSION OF MESSAGES

(75) Inventors: Bengt Erik Ingemar Gard, Tullinge; Lars-Örjan Kling, Södertälje; Sten Edvard Johnsson, Farsta, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/265,963

(22) Filed: Mar. 11, 1999

(30) Foreign Application Priority Data

Mar. 12, 1998 (DE) ......................................... 198 10 807

(51) Int. Cl.[7] ................................................. G06F 9/44
(52) U.S. Cl. ........................ 717/168; 717/171; 709/313
(58) Field of Search ................................. 709/100, 221, 709/202, 106, 205–207, 223, 230, 232, 313–317, 331–332, 40; 379/32.03; 711/162; 717/168, 151, 136, 169–178, 152–153

(56) References Cited

U.S. PATENT DOCUMENTS

| | | | | |
|---|---|---|---|---|
| 4,837,785 A | * | 6/1989 | McAlpine | 370/438 |
| 5,155,837 A | | 10/1992 | Liu et al. | 709/221 |
| 5,410,703 A | | 4/1995 | Nilsson et al. | 717/168 |
| 5,455,932 A | * | 10/1995 | Major et al. | 711/162 |
| 5,649,112 A | | 7/1997 | Yeager et al. | 709/220 |
| 5,699,275 A | * | 12/1997 | Beasley et al. | 709/221 |
| 5,734,899 A | | 3/1998 | Yoshizawa et al. | 707/203 |
| 6,018,567 A | * | 1/2000 | Dulman | 379/32.03 |
| 6,049,819 A | * | 4/2000 | Buckle et al. | 709/202 |
| 6,101,327 A | * | 8/2000 | Holte-Rost et al. | 717/170 |

FOREIGN PATENT DOCUMENTS

| | | | | |
|---|---|---|---|---|
| JP | 7-152633 | | 6/1995 | ........... G06F/12/00 |
| WO | WO 96/18146 | * | 6/1996 | ........... G06F/9/445 |
| WO | WO 98/07094 | | 2/1998 | ........... G06F/13/14 |

OTHER PUBLICATIONS

Ulf Keusel et al., Remote Upgrading and Updating of AXI 10 Software, Ericsson Review No. 2, 1996.
"NETBIOS Add.Name in Switched Networks" IBM Technical Disclosure Bulletin, vol. 35, No. 2; Jul. 1, 1992; pp. 404–407, XP000313337; ISSN: 0018–8689 the whole document.

* cited by examiner

Primary Examiner—Tuan Q. Dam
Assistant Examiner—Hoang-Vu Antony Nguyen-Ba
(74) Attorney, Agent, or Firm—Burns, Doane, Swecker & Mathis, L.L.P.

(57) ABSTRACT

To achieve a highly efficient upgrade of software in computer based systems a message conversion apparatus (34) comprises an interface unit (36) for message conversion information (MCI) describing at least one message being exchanged in a software processing system before and after an upgrade of the software processing system. Also, a message conversion means (38, 40) is provided to convert the message between old and new representation for the upgraded software processing system in compliance with the specifications given in the message conversion information (MCI). Therefore, it is possible to introduce a disturbance free upgrade of software in computer based systems with minimized system downtime.

29 Claims, 16 Drawing Sheets

FIG.3

| MESSAGE REFERENCE | SOURCE | TARGET | |
|---|---|---|---|
| 1 | 1 | 2 | DATA · · · |
| 2 | 1 | 3 | DATA · · · |
| 3 | 3 | 1 | DATA · · · |
| 4 | 2 | 3 | DATA · · · |
| · · · | · · · | · · · | |

FIG.6
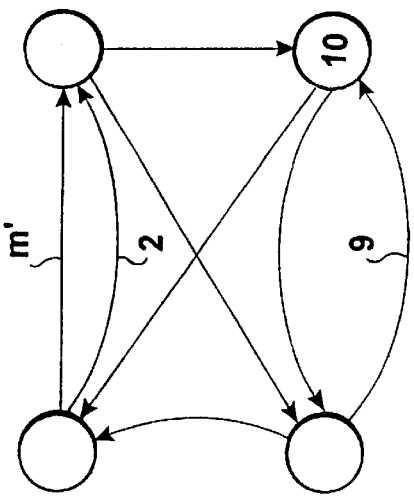
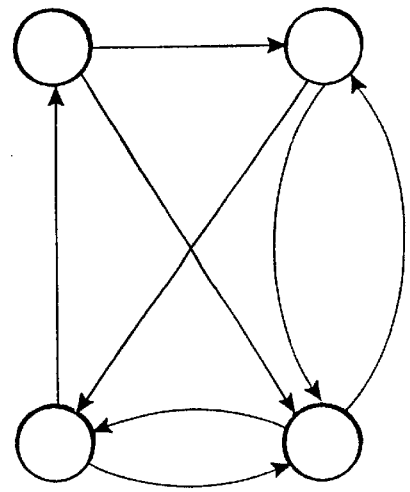

$d_{NEW} = EXPR(d_{OLD})$

FIG.9

| | OLD | NEW |
|---|---|---|
| | | |
| AMENDED MESSAGE 2, ACC. TO FIG.6 | 3 2 1 2 | 2 2 1 2 |
| | | |

FIG.10

| TARGET / SOURCE | OLD | NEW |
|---|---|---|
| OLD | NO CONV. | CONV. |
| NEW | CONV. | NO CONV. |

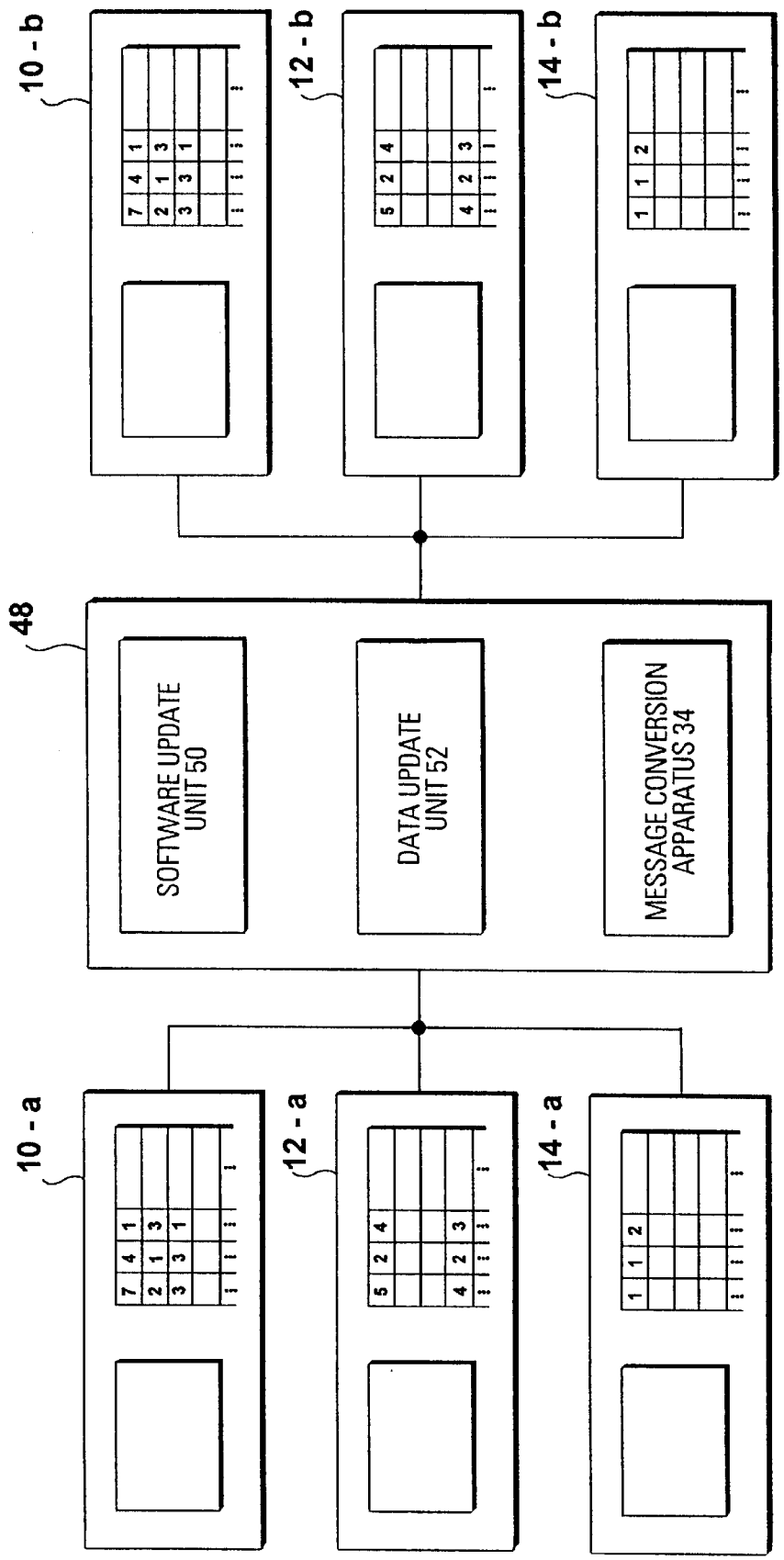

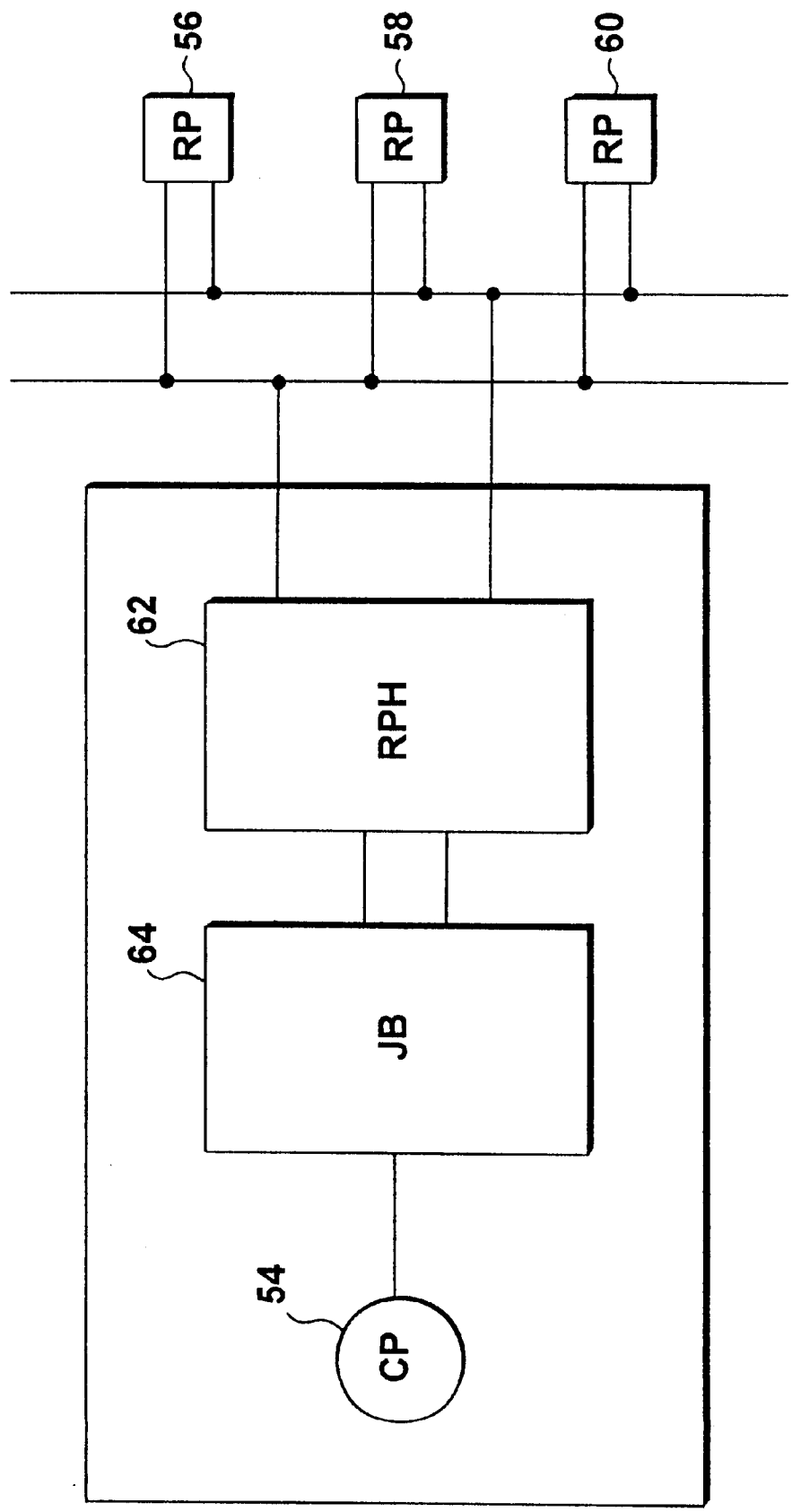

APPARATUS AND METHOD FOR CONVERSION OF MESSAGES

FIELD OF INVENTION

The present invention relates to a message conversion apparatus. Further, the present invention relates to a software processing device and to a method for conversion of messages.

BACKGROUND OF INVENTION

In performing the upgrade of software there is usually some kind of disturbance to the operation of the system being upgraded. This disturbance can range from a total system shutdown during hours and possible days to a short disruption of possibly only some limited part of the total functionality of the system, e.g., a few seconds. Conceivably, there may be no disturbance at all although this is typically not the case in real existing systems. However, for systems like communication exchanges, it is of great importance that any disturbance is small and as short as possible.

To achieve a disturbance-free upgrade of software even with permanently long executing software modules it is a pre-requisite that new software is upgraded with all necessary data from the old software while the old software is continuously executed. When data of new software has reached the same state as data of old software the new software takes over execution.

The simplest method to upgrade software is to stop the execution of old software, load new software, and finally to start the new software. Using this method no data is transferred between the old software and the new software. Further, all established software processes are lost and the execution of software is stopped during the load and start of the new software. Usually, this method is used, e.g., for workstations and personal computers.

An improved approach for a communication system has been described in "Remote upgrading and updating of AXE 10 software", page 66, 67 Ericsson Review No. 2, 1996. Here, the new software is loaded while the old software is still handling establishment of services provided to subscribers. Data is transferred between old software and new software. Data variables containing data to be transferred are identified in so-called data change information and can either be of the type copy or convert. For each convert data variable a conversion program specified in the data change information is executed to achieve the transformations and to transfer the conversion output to the new software. However, during the transfer of the data necessary for already established services from the old software to the new software the establishment of additional services is stopped.

Thus, when performing a software upgrade there exists always a disturbance to the system being upgraded. This disturbance can range from a total system shut down during hours and possibly days to a short disruption of perhaps only some limited part of the total functionality of the system, i.e. a few seconds. However, in particular for system like telecommunication exchanges it is of great importance that any disturbance is as short as possible since increased system downtimes imply a loss of revenues to the service providers.

Further, while in systems containing a lot of software modules messages should survive a system upgrade this is currently not supported at all. Therefore, termination of messages lead to an increased disturbance of systems during upgrade. In particular, services may be aborted or canceled in case of a software upgrade which could not be allowable for certain services being related to, e.g., health care or security.

SUMMARY OF INVENTION

In view of the above, the object of the invention is to achieve a smooth upgrade of software in computer based systems.

According to a first aspect of the invention this object is achieved through a message conversion apparatus comprising an interface means for message conversion information describing at least one message being exchanged in a software processing system before and after an upgrade of the software processing system, and a message conversion means adapted to convert the message into the new representation for the upgraded software processing system in compliance with the specifications given in the message conversion information.

Therefore, according to the present invention it is possible to convert messages according to an upgraded system. This implies that also messages and not only data internal to the software units in the system survive a system upgrade to reduce and minimize the disturbance of the system. Also, since the message change information is received via a related interface means, the functionality of the message conversion apparatus may be easily modified according to prevailing requirements.

According to a preferred embodiment of the present invention the message conversion means is activated upon switch over to the upgraded software processing system. In case messages are already converted at switchover the overall start up time of upgraded software units later on is avoided.

According to another preferred embodiment of the present invention the message conversion means is activated upon job start of software in the software processing system. This approach facilitates gradual upgrading of the system as it makes it possible to perform bidirectional communication between old and new software modules, as messages are only converted on demand.

According to another preferred embodiment of the present invention a message control information processing means converts a message control information comprising at least one of a message reference, a message source software unit, a message target software unit, and a message class respectively, and a message data processing means converts at least one data element of a message data section. Further, preferably the message control information processing means and the message data processing means execute the conversion of received messages using functional relationships.

In case messages are split into a message control information part and a data part it is possible to further reduce the computing resources necessary for message conversion since in case the elements control information part is to be converted only very few data must be handled. Also, this message structure supports easy and effective conversion of data elements using a functional relationship.

Also, according to a second aspect of the present invention the object outlined above is achieved through a software processing device of the type with upgrade functionality, comprising at least one message buffer storing messages to be processed by the software processing device, at least one application unit processing messages stored in the at least one message buffer, and a message conversion apparatus adapted to convert messages into a new representation after an upgrade of the at least one application unit according to the first aspect of the invention.

According to another preferred embodiment of the present invention the software processing device is of the distributed type with a plurality of application units each being connected to the conversion apparatus. Alternatively, the software processing device is of the distributed type with a plurality of application units being connected to a single conversion apparatus or the software processing device comprises two logic partitions being connected to the conversion apparatus.

Therefore, the present invention enables the realization of a variety of software processing devices according to specific needs. In particular in case a plurality of application units are provided within the software processing devices this allows for concurrent execution of old software and the system upgrade. Further, in accordance with the amount of messages to be converted, either only a single or a plurality of message conversion apparatuses could be provided in the software processing device.

Finally, according to a third aspect of the present invention the object outlined above is achieved through a system upgrade method for a computation system with at least two logic partitions, comprising the steps upgrading the state of new software in a standby partition means to the state of old software in an executing partition means while continuing execution of the old software, switching to the execution of new software as far as the same state is achieved for the standby partition means and the executing partition means, and conversion of messages transmitted between different software modules in the computation system to a format suitable for the receiving software either at switch over to the execution of the receiving software or on demand at job start of the receiving software.

Here, not only old software and data being related thereto are upgraded but also messages being exchanged between these software units. All these steps are carried out while the system continues to operate the old software in parallel and with minimized disturbance on the system performance.

BRIEF DESCRIPTION OF FIGURES

Preferred embodiments of the present invention will be described with reference to the appended drawing in which

FIG. 3 shows the representation of messages on a machine level according to the present invention;

FIG. 6 shows the modification of message data through the upgrade of a system specification according to the present invention;

FIG. 9 shows a table storing that part of the message control information being involved during message conversion;

FIG. 10 shows a table summarizing different cases of message conversion according to the present invention;

FIG. 14 shows the application of the message conversion unit according to the present invention to a system having a redundant structure comprising two operating partitions;

FIG. 16 shows the structure of a central processing unit connected to message buffer according to an exchange of a communication system as a typical example for the application of the present invention;

DESCRIPTION OF PREFERRED EMBODIMENTS

In the following, preferred embodiments of the present invention will be explained with respect to the figures described above and on the reference to terminology listed in the following:

| | |
|---|---|
| SU | software unit |
| MCI | Message Conversion Information. A specification provided by the designer, specifying how messages received in one or several old SUs are related to messages received in one or several new SUs including any carried data |
| SUID | software unit identity used by a designer to specify a particular software unit |
| SU_Reference | a machine level representation of SUID |
| MESSAGEx | a unique identity to specify a particular message class x; MBSSAGEx could be globally unique (e.g., a naming plan of messages common for all SUs) or local (e.g., unique names per SU). In the latter case a complete unique specification of a message class must contain both an SUID and a MESSAGEx |
| message_reference | a machine level representation of MESSAGEx, e.g., a number or some machine-level address which could be global (e.g., a numbering of messages common for all SUs) or local (e.g., one numbering per SU). In the latter case, a message of a particular message class could be stored in the message buffer as target_SU_reference.target_message_reference.source_SU_reference source_message_reference.data_1.data_2. ... In the following, messages are assumed to be unique per SU, both in the high-level and the machine-level representation |
| DATAm | data number m; used with MESSAGEx to specify data number m carried by MESSAGEx |
| data_m | machine level representation of DATAm |

Figure 1:
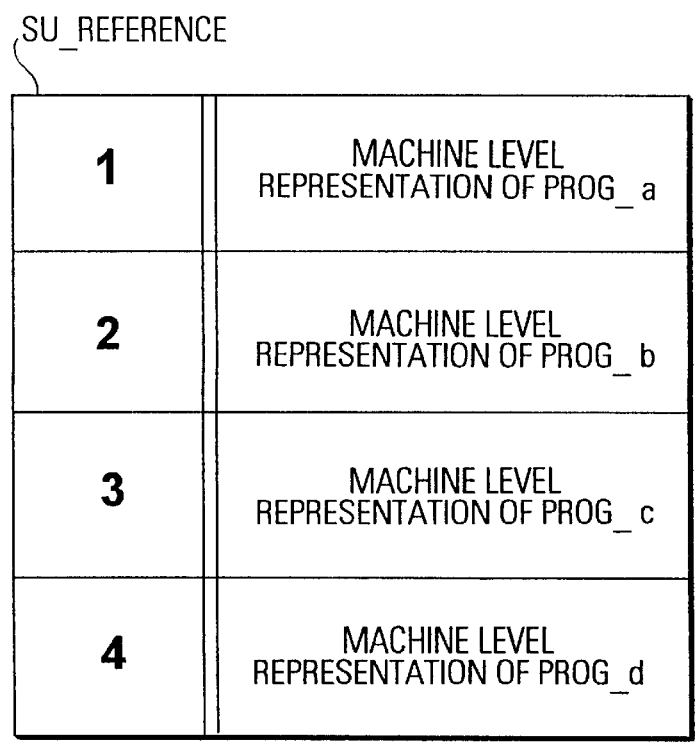
FIG. 1 shows a representation of software units on a machine level according to the present invention.

According to the present invention, each software unit SU is identified through a software unit identity SUID consisting, e.g., of a sequence of letters and digits. As shown in FIG. 1, typical examples for such a SUID are Prog_a, Prog_b, and Prog_c, respectively. As shown in FIG. 1, during actual operation of the system, reference is made to a machine level representation of software units SU_Reference, e.g., as program or module number or address for access to a memory storing the machine level representation of the software unit.

Figure 2:
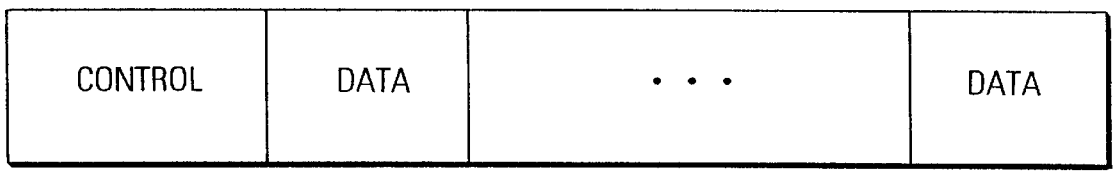
FIG. 2 shows the specification of message classes according to the present invention.

As shown in FIG. 2, to specify a system operation it is not only necessary to refer to software units SU but also to messages MESSAGEx which are exchanged between different software units during operation of the system. Here, MESSAGEx specifies a particular message class. As shown in FIG. 2, each message class subdivides into a control information part and a data part where DATAm is used with MESSAGEx to specify data number m carried by MESSAGEx. Similarly, control is used to specify a control information part carried by MESSAGEx. The control information part could be separated into subparts, e.g. a header part and a trailer part.

FIG. 3 shows a machine level representation of different messages belonging to the different message classes shown in FIG. 2. Here, each control information part could consist of e.g., a message reference, an indication of a source of the message and an indication of the target of the message. It could also contain other information for controlling and securing the flow of messages, e.g., sequence numbers, checksum etc.

Finally, the data items assigned to a particular message referred to by the message would follow as a sequence of data elements. Thus a representation of messages as shown in FIG. 3 allows to achieve access to all information relevant for a particular message.

Figure 4:
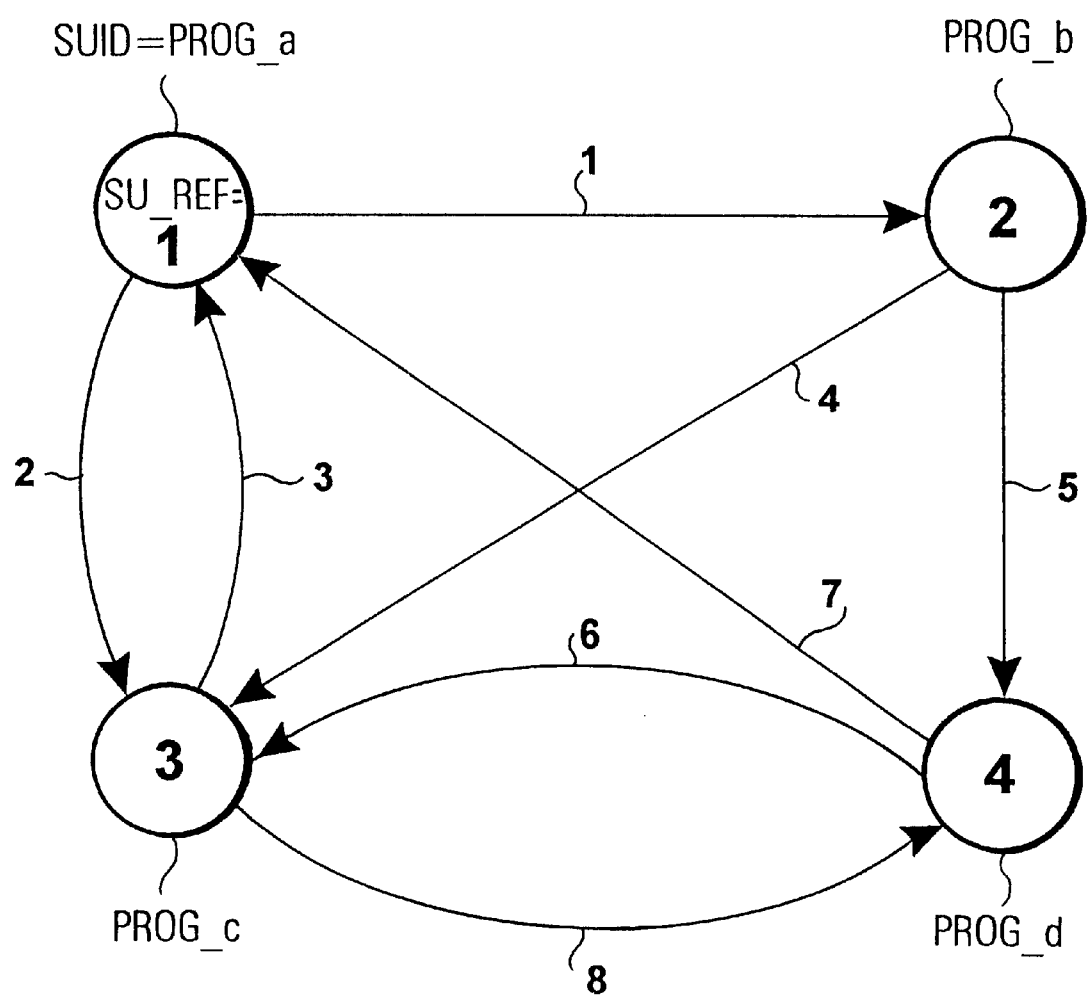
FIG. 4 shows the specification of the system operation on a functional level.

FIG. 4 shows how the representation of software units and messages shown in FIGS. 1 and 3, respectively, may be used to describe the system operation on a functional level using a directed graphical representation. As shown in FIG. 4, to each node there is assigned a software unit identity SUID or equivalently a machine level reference SU_Reference. The respective choice will depend on the fact whether the system operation is described on an abstract level or on a machine level. As outlined above, the different software units being represented by the nodes of the graph interact with one another through the exchange of messages described as directed arcs in the representation. As shown in FIG. 4, to each edge in the graph, there is assigned the message_reference. Therefore, message 1 is exchanged between the source software unit Prog_a and the target software unit Prog_b. Further, message 2 is exchanged between the source software unit Prog_a and the target software unit Prog_c, and so on.

Figure 5:
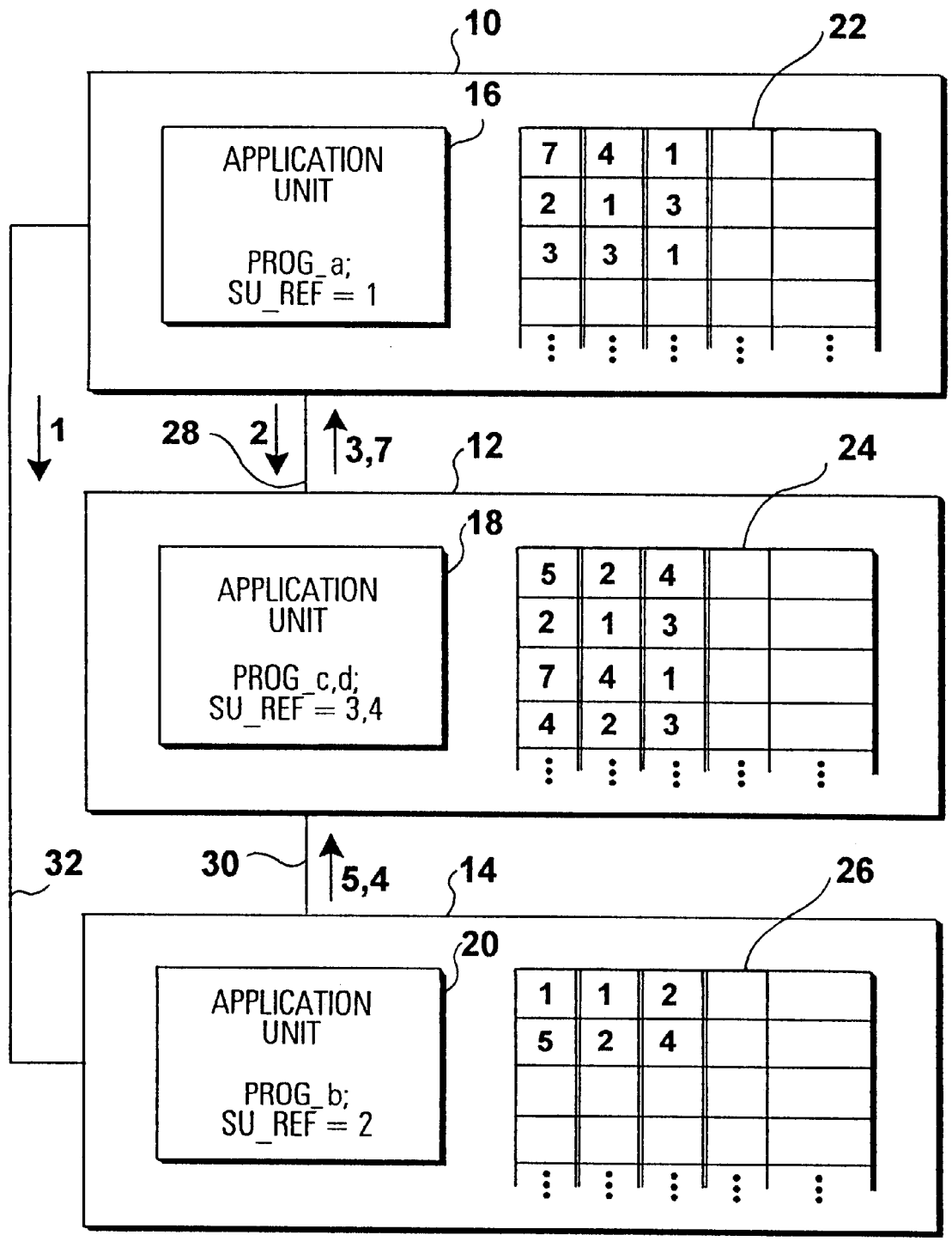
FIG. 5 shows the mapping of the system specification on a functional level according to FIG. 4 onto an existing system architecture.

While FIG. 4 shows the explanation of the system operation on a functional level, FIG. 5 shows the corresponding description on a structural level.

As shown in FIG. 5, typically a system subdivides into a plurality of system components 10, 12, 14. Each system component comprises an application unit 16, 18, 20 that enables the execution of software units. As shown in FIG. 5, the software unit Prog_a with SU_Ref=1 is assigned to the application unit 16, software units Prog_c, d with SU_Ref= 3, 4 is assigned to the application unit 18, and a software unit Prog_b with SU_Ref=2 is assigned to the application unit 20.

To implement the exchange of messages each system component 10, 12, 14 also comprises a message buffer 22, 24, 26 where messages are stored before they are processed in the respective application unit 16, 18, 20, respectively. For the actual exchange of messages between the system components 10, 12, 14 there are provided connections 28, 30, 32 connecting the different system components.

As shown in FIG. 5, these connections carry the different messages shown as edges of a directed graph in FIG. 4 along the indicated directions. It should be noted, that FIG. 5 clearly only gives an example for the mapping of a system specification on a functional level onto an existing hardware structure and that modifications and amendments in dependence on actual requirements will lie within the gist of the present invention.

As already outlined above, during system upgrade the software units in the different application units are upgraded together with data corresponding to the current internal status of the used software units. However, as shown in FIG. 5 irrespective of the effectiveness of this upgrade of software units there still remains the task to consider messages in the different message buffers 22, 24, 26 that are stored according to the system specification before the upgrade.

Therefore, one important aspect of the present invention is to provide an efficient approach also for the upgrade of these messages in addition to the upgrade of software and related internal data. As will be shown in the following, this allows for a reduced overall system downtime during the upgrade process and for a further increased system availability and security.

FIG. 6 shows the impact of the system upgrade on the machine level representation of messages. In particular, the left side of FIG. 6 shows the functional representation of the system operation and the related machine level representation of messages before an upgrade while the right side of FIG. 6 illustrates the impact of the upgrade process thereon.

As shown in FIG. 6, the conversion of messages may either be due to a change of the source code of a sending software unit or the target code of a software unit or both.

A first example for the change of a software unit would be the assignment of a new message class to a message, e.g., due to a protocol change. The next example according to the second line of the table shown in FIG. 6 relates to the change of the target software unit. Here, the edge with the message_reference 2 initially been directed from the upper left node to the lower left node is redirected from the upper left node to the upper right node. As can be seen in the related machine level representation, in particular the third column of the second line, the corresponding entry of the control information part is amended from 3 to 2. As shown in FIG. 6, messages also remain unchanged according to the third and fourth line of the tables shown in FIG. 6.

The next type of message conversions due to a system upgrade are related to a change in target code of a software unit change according to the fifth line of the table shown in FIG. 6.

One typical example would be that the message has the same identity and is received in the same software unit after the system upgrade but as another message reference and/or source/target software unit reference. Accordingly, in case the lower right node is amended from SU_Ref=4 to SU_Ref=10 a related entry in the second column of line 5 is amended from 4 to 10. Further, if the reference to the message is amended to 9 the corresponding first entry is amended from 8 to 9.

It should also be noted that according to the present invention information necessary for the conversion of messages explained above is summarized into a message conversion information that could either be provided by the designer responsible for the upgrade of the system in case of changes in source code of software units or even be automatically generated by design tools in case of changes in target code of software units. Also, in considering conversion of messages the focus is on received messages as only then a conversion is necessary before further processing thereof.

Figure 7:
FIG. 7 shows the modification of message data through the upgrade of the system specification according to the present invention.

As shown in FIG. 7, a conversion of messages not only relates to the conversion of control information but also to the conversion of related data elements.

Here, the interrelationship between old and new data elements is specified using a functional relationship specified in expr ( ) which is part of the system specification for the upgrade and may, e.g., be available through the design system for the system upgrade.

Further, a mapping of old data elements to new data elements does not require a one-to-one correspondence but old data elements may be omitted or new data elements may be added. Further options are the reversal of the sequence of data elements and the amendment of the data types used for the different data elements.

Figure 8:
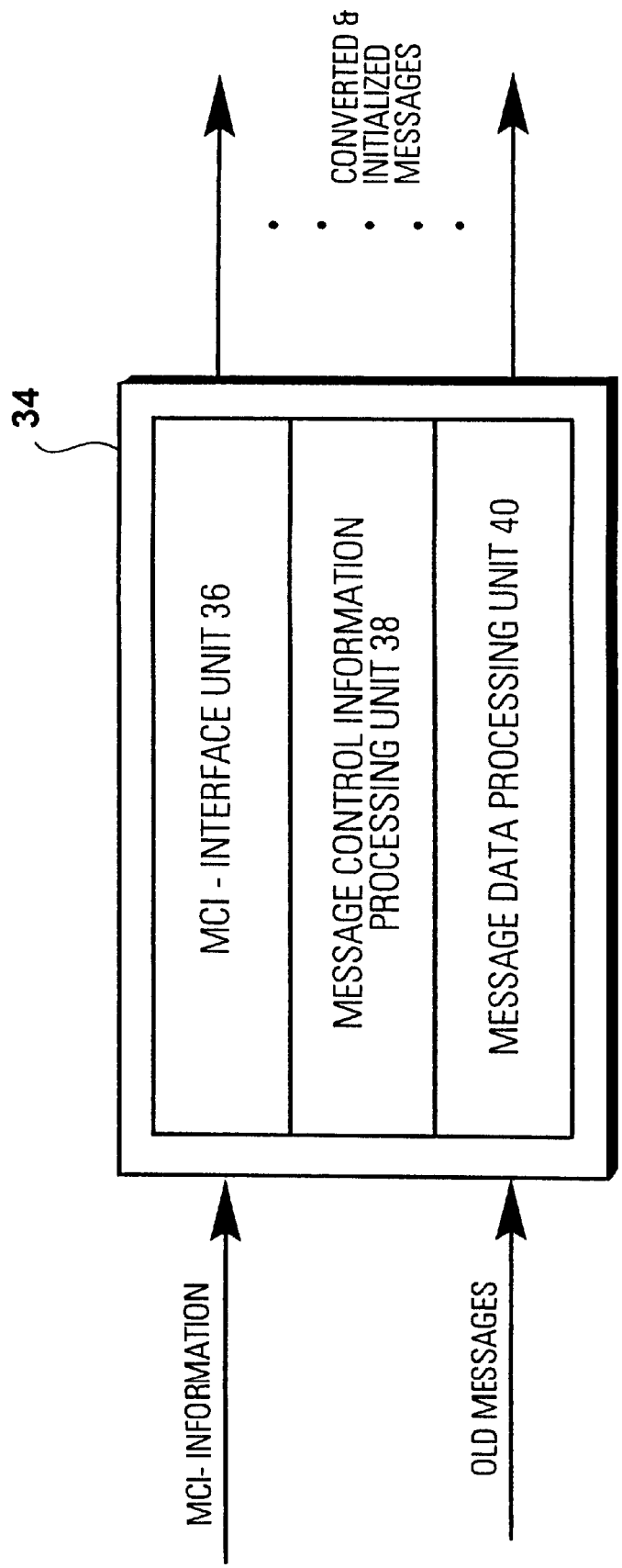
FIG. 8 shows a schematic diagram of a message conversion unit according to the present invention.

All the different steps outlined above under reference to a specific example are generally executed in a message conversion apparatus 34 shown in FIG. 8. This message conversion apparatus 34 comprises a message conversion information interface unit 36 and a message conversion unit. The message conversion unit subdivides a message control information processing unit 38 and a message data processing unit 40.

As shown in FIG. 8, the message conversion information interface unit 36 receives message conversion information MCI describing at least one message conversion necessary due to an upgrade of the software processing system. Also, messages according to the machine level representation thereof before the upgrade of the system are provided, both, to the message control information processing unit 38 and the message data processing unit 40. As will be explained in more detail in the following, an upgrade of the system may also lead to the insertion of new messages therein, so that the overall output of the message conversion apparatus 34 consists not only of converted messages but also of newly initialized messages, as shown in FIG. 8.

The message control information processing unit 38 converts the message control information as described above, and therefore modifies, e.g., a message_reference, a message source software unit, a message target software unit and a message class, respectively. Also, the message data processing unit 40 converts at least one data element of a message data section to be converted.

For the activation of the message conversion unit 34 one option is the time of switch over to the upgraded software. Here, in case a related software unit in the upgraded system is started later on, no time would be lost since the messages have already been converted. Nevertheless, a further option would be to activate the message conversion apparatus 34 according to the present invention on demand at the job starting time of the receiving or target software units so that message conversion only takes place on demand, i.e. when the message is to be delivered to the receiving software unit.

According to the present invention, the overall scheme for the conversion of different messages is, e.g., carried out using conversion information on a machine level representation as outlined in the following. One possible implementation according to the present invention could contain a table storing the part of the message control information being related to messages that identifies the message type, i.e. the SU reference or the message reference, respectively, together with information related to old and new software units. One such table that may be used for the translation of the message control information part according to messages transferred from old software units to new software units or vice versa could be structured as follows:

| NEW | OLD |
|---|---|
| target_SU reference 1. | target_SU reference2. |
| target_message_referencel. | target_message_reference2. |
| source_SU referencel. | source_SU reference2. |
| source_message referencel | source_message reference2 |
| target_SU_reference3. | target_SU_reference4. |
| target_message_reference3 | target_message_reference4. |
| source_SU_reference3. | source_SU_reference4. |
| source_message reference3 | source_message_reference4 |
| target_SU_reference5. | target_SU_reference6. |
| target_message_reference5 | target_message_reference6. |
| source_SU reference5. | source_SU reference6. |
| source_message_reference5 | source_message_reference6 |
| target_SU_reference7. | target_SU_reference8. |
| target_message_reference7 | target_message_reference8. |
| source_SU-reference9. | source_SU_referencel0. |
| source_message_reference9 | source_message_referencel0 |

According to the present invention, the contents of this table is either specified through the designer of the system or automatically through a compiler and linker functionality processing information given in a higher level representation. Also, according to the present invention, entries in the table need only exist in case a conversion is actually necessary at system upgrade.

Here, it should be noted that the two columns in the table may be thought of representing the left-hand and right-hand side of an equation according to $$L.H.S.(new) = R.H.S(old) \qquad (1)$$

In the following the "=" character should be interpreted as "is equivalent to" or "corresponds to".

Therefore, according to the present invention a statement like L.H.S.=R.H.S with respect to one row in the table is a machine level representation of a conversion case.

Typically, when software upgrade is executed step by step, there is maintained a list of upgraded and not yet upgraded software units SU to determine for each message whether a conversion from an old to a new format or from a new to an old format is necessary or not.

Without restricting the scope of the invention it may be assumed that the same combination "SU_reference.message_reference" cannot occur on both the new and old side. The reason heretofore is that for each message to be eventually converted there should exist only a single entry in the table, in particular if old and new software units are executed concurrently. Further, it is possible to add a "version" as additional information to the message conversion. This extension is not needed in case after a software upgrade switchover to new software units is executed in a single step as conversion of messages in this case is only executed in one direction, i.e. from old to new.

One typical example for a conversion task would be that there exists a message from an old software unit to a new software unit where the message was stored in the message buffer as result of sending a message from a not yet updated software unit in case the receiving software unit has already been updated at message delivery. Further, there could exist a message from a new software unit to an old software unit. In that case the message was stored in the message buffer as result of sending a message from an already updated software unit to the receiving software unit being not yet updated at the time of message delivery. According to the present invention, e.g., at job start the message in the message buffer is examined. If there exists a match between the control information of the message and the contents of an entry of the table outlined above, i.e. on the proper side depending on the fact whether the buffered message is of the new or old format, this would mean that the message should potentially be converted.

In such a case according to the present invention the target_SU_reference is determined and then it is checked if this software unit is updated and new or not yet updated and old. The result of this interrogation determines whether the format should be of the new or old format according to the table outlined above when the message is delivered to the receiving or target software unit.

Further, if source_SU_reference is determined it is checked whether the related software unit is of the same type, i.e. of the new or old type, as the target software unit. In such a case no conversion would be necessary. However, in case the source and target software unit are of different type the message exchanged therebetween should be converted. Here, the direction of conversion, i.e. new to old or old to new, depends on the fact which of the software units is old and which is new.

FIG. 9 illustrates the general principles outlined above using the example shown in FIG. 6 where the message with message_reference 2 has been redirected from the original target software unit to the new target software unit 2. Assuming that the further conversion related message control information remains unchanged, the entries in the table representing this message control information would be as shown in FIG. 9. Therefore, in case the message would be handled either before or after upgrade of the software processing system, the related entry could be found either on the lefthand or righthand side of this table, respectively, and then be used to carry out the particular message conversion, i.e. the amendment of the target_SU_reference in this particular case.

Further, the different situations where a conversion takes place between old and new source and target software units discussed above may be summarized as shown in FIG. 10. Here, it can be seen that no conversion is necessary in case both, the source and the target software unit are of the same type old and new, respectively. Otherwise, a message conversion takes place in the sense outlined above.

Further, one option according to the present invention derivable from FIG. 10 is to carry out the above referenced steps at switch over, whereupon it is only possible to convert from old to new. Here, the new software that is switched in does not process messages according to the old format. Therefore, in case all new software units are switched in at the same time conversion from the new to the old format should typically not be needed as no software units remain that process messages according to the old format. In such a case it is possible to convert all messages in the message buffers in one sequence.

Further, this approach may also be used with wild cards in the matching between messages in the message buffer and the conversion table. E.g., at the bottom of the table it is stated that "target_SU_reference7.target_message_reference7" always corresponds to "target_SU_reference8.target_message reference8" and that "source_SU_reference9. "source_message_reference9" always corresponds to "source_SU_reference10.source_message_reference10" independent of the other information, which then should be unchanged. This principle for describing conversions can be generalized to any information that is part of the message.

More complex conversions, e.g., containing arithmetic and logic expressions, should preferable not be stored directly in the table. Instead, the table can be complemented with a reference to some other information, e.g., a conversion program describing the complex conversion.

In the following, the high level representation of message formats will be explained. In the high level representation differences in formats and contents are specified in a way similar to the way how messages are specified in the source code of application programs of the application software units processing the messages.

One example according to the present invention would be that a message is specified by some unique identity, e.g. the message name in case the name is unique throughout the system or a combination of message name and a name of the software unit processing the same. In the following, it is assumed without any restriction that a unique identity specifying a message is given by $$\text{SUID.MESSAGEx} \tag{2}$$

where SUID is a unique identity of a program and MESSAGEx is a locally unique (within the program) identity of a message handled by that program. SUID and MESSAGEx would typically, but not necessarily, consist of a string of characters.

According to the present invention a compiler and linker function translates this representation, e.g., consisting of character strings, to a representation more efficiently processed by the conversion function in the target system. Typically, SUID could be translated into a unique program number or some other unique suitable address. Similarly, a message name MESSAGEx could be translated into a message number or some machine dependent address.

Here, these machine-level representations are called

SU_reference and message_reference, respectively.

It should be noted that the compiler and linker in some cases can also generate information which does not have to be explicitly given in the high-level representation. For instance, if a message is always sent by one specific program and received by one other specific program, the high-level information $$\text{Target\_SUID.MESSAGEx} \tag{3a}$$

is sufficient to generate the complete low-level information $$\text{target\_SU\_reference.target\_message\_reference.source\_SU\_reference.source\_message\_reference} \tag{3b}$$

Thus, in such a case a high-level statement $$\text{New\_Target\_SUID.MESSAGEx=Old\_Target\_SUID.MESSAGEy} \tag{4a}$$

can generate the complete machine-level representation $$\text{new\_target\_SU\_reference.new\_target\_message\_reference.new\_}$$

$$\text{source\_SU\_reference.new\_source\_message\_reference=old\_target\_SU\_}$$

$$\text{reference.old\_target\_message\_reference.old\_source\_SU\_reference.old\_source\_message\_reference} \tag{4b}$$

Therefore, according to the present invention it is possible to convert messages also in case changes in the system or in the respective software unit lead to changes in the software references and the message references, i.e., through adding a new software unit in the system or a new message in a program thus changing the machine level numbering of either the software units or the messages. Here, such changes do not have to be explicitly described by the designer in a high level description as the compiler and linker function may generate the necessary information anyway.

Further, if the identities MESSAGEx and MESSAGEy are equal there is no source code level difference at all regarding this message class seen in the source code of the respective software units. Therefore, the compiler and linker function may generate any necessary machine level information without any explicit high level information except the identities of the software unit IDs SUID of the new and old software units. Here, according to the present invention the default could be that messages not changed on a high level representation do not have to be described by the designer and that the compiler and linker function in such cases takes care of any changes on the machine level representation.

Figure 11:
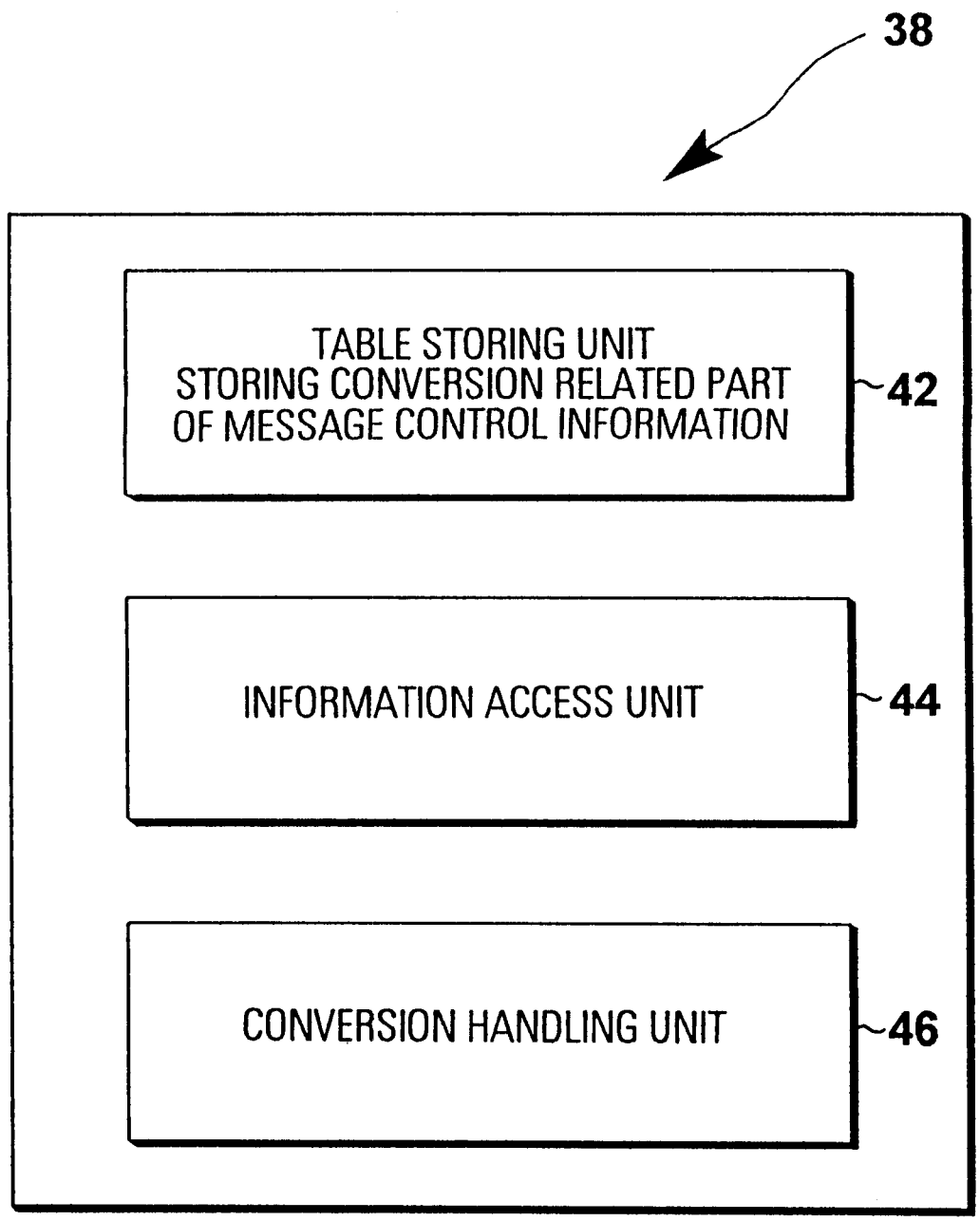
FIG. 11 shows a schematic diagram of the message control information processing unit according to the present invention.

As shown in FIG. 11, it follows that the message control information processing unit 38 of the message conversion apparatus 34 shown in FIG. 8 is basically subdivided into three functional units. The first unit is a table storing unit 42 storing conversion related parts of message control information for the different messages. Secondly, there is provided an information access unit 44 that allows to carry out the access to the table storing unit 42 in dependence on a specific information provided with respect to a message such as a message reference, e.g., according to the old and new format, respectively. Thirdly, a conversion handling unit 46 implements the different types of conversions shown in FIG. 10 according to the information stored in the table storing unit 42 as provided through the information access unit 44.

In the following, typical examples for such message conversions executed through the different units in the message conversion unit 34 will be described. In the examples to follow it is assumed that the upgrade procedure is such that only conversion takes place from old to new format, e.g., that there exists no simultaneous execution of old and new software processing units that exchange messages to be converted. However, it should be noted that according to the present invention it is clearly possible to also cover the direction from new to old format using the principles outlined above. Further, in the following it is assumed that the machine level message control information contains the parts target_SU_reference.target_message_reference.source_SU_reference.source_message_reference (5)

However, alternative implementations containing more or less information can also be used, e.g., only target_SU_reference.target_message_reference (6)

In addition, the changes according to the examples are also combinable, e.g., according to change of both, message name and message data which is not explicitly shown in the examples to avoid lengthy repetitions.

The first example relates to a change of a message name which may be expressed according to a high level expression as New_SUID.MESSAGEx=Old_SUID.MESSAGEy (7a)

Therefore, the message called MESSAGEy in the old software unit will be called MESSAGEx in the new upgraded software unit. Any old MESSAGEy in the message buffer should therefore be converted to the new MESSAGEx. Here, new_SUID and old_SUID may either be target_SUIDs or source_SUIDs. Further, the machine level description generated by the compiler and linker from this high level representation (7a) is new_SU_reference.new_message_reference=old_SU_reference.old_message_reference (7b)

Here new_SU_reference and old_SU_reference may either be of the target or source type, but the same as in the high level description. In some cases, e.g., with a unique sender or receiver it is possible to generate both target and source parameters from only a single type.

The next case relates to the change of a software unit reference expressed on a high level description as New_SUID=Old_SUID (8a)

Here, the new version of the old SU with the identity old_SUID is assigned the new identity new_SUID. Thus, all old messages in the message buffer that are sent or received by the old software units with the identity old_SUID must have a source_SU_reference or target_SU_reference, respectively, changed from old_ ... to new_ ...

Further, the machine level description generated by the compiler and linker from the high level description could be two statements according to new_source_SU_reference=old_source_SU_reference new_target_SU_reference=old_target_SU_reference (8b)

The next example relates to the change of a message reference expressed on a high level description as New_SUID=Old_SUID (9a)

In this example if the message names are the same in the old and new software unit and the compiler will recognize which old message corresponds to which new message, there is no need to map this high level description to a message level. To the contrary, the messages may change reference irrespective of the fact that the identity is the same since the translation identity to reference may be also dependent on other changes. Here, a machine level description generated by the compiler and linker from the high level description may be expressed according to two statements for each message class new_source_SU_reference.new_source_message_reference=old_source_SU_reference.old_source_message_reference new_target_SU_reference.new_target_message_reference=old_target_SU_reference.old_target_message_reference (9b)

Further, with respect to the change of a message reference according to the present invention it should be noted that the information according to equation (9b) needs only to be generated in case there are any changes in message references. However, this is also a general principle, i.e. if there are no differences between old and new parameters in the machine level representation it can be omitted as there is no need for conversion. This is even true in case there was previously a difference in the high level representation, e.g., such as a changed message identity.

The fourth example relates to the termination of a message expressed on a high level description as TERMINATE Old_SUID.MESSAGEx (10a)

Typically, any messages of the type called MESSAGEx in the old software processing units with identity old_SUID should be removed from the message buffer, e.g., since there is no receiver in the new software processing units. Further, old_SUID may be either of the source or target type. A machine level description generated by the compiler and linker from the high level description according to equation (10a) is terminate old_SU_reference.old_message_reference    (10b)

Here, old_SU_reference may either be of the source or target type but be consistent with the high level representation.

The next case relates to the contrary of a termination of a message, i.e. to the initialization of a message. Here, the high level representation is INITIATE New_SUID.MESSAGEx[WITH data1,data2, . . . ](11a)

Further, a message of the type called MESSAGEx by the new software processing unit carrying the identity new_SUID should be delivered to the new software processing unit. The message may optionally contain data as defined. In case MESSAGEx has multiple senders or receivers both target and source SUID may have to be specified (not shown). The machine level description generated by the compiler and linker from the high level description (11a) is initiate new_SU_reference.new_message_reference[with data_1,data_2, . . . ]    (11b)

Finally, a further example relates to a change of message data according to the high level description New_SUID.MESSAGEx.DATAm=Old_SUID.
        MESSAGEx.DATAi+Old_SUID.MESSAGEx.DATAk    (12a)

Here, DATAm carried by the new format message called MESSAGEx in the new software processing unit with identity new_SUID corresponds to the sum of DATAi and DATAk, both carried by the old format MESSAGEx in the old software processing unit with identity old_SUID. In general, the expression on the righthand side of equation (12a) may include, e.g., one or several data carried by old format messages and also constants and arithmetic and logic operations, i.e.

SUIDx.MESSAGEy.DATAm=expression(SUIDz.
        MESSAGEu.DATAi,SUIDv.MESSAGEw.DATAk, . . . ,constant1, . . . )    (12b)

Further, the SUIDs may be either of the type source or target.

The machine level description generated by the compiler and linker from the high level description is new_SU_reference.new_message_reference.data_m=old_SU_reference.old_message_reference.data_i+old_SU_reference.old_message_reference.data_k    (12c)

Also, the SU_references may be either of the source or target type but must be in compliance with the high level description.

As outlined above, all conversion steps are based on functional relationships irrespective of the time of execution.

While in the above the specific structure and functionality of the message conversion apparatus according to the present invention has been described, in the following typical examples for the application thereof will be described with respect to FIG. 12 to FIG. 17.

Figure 12:
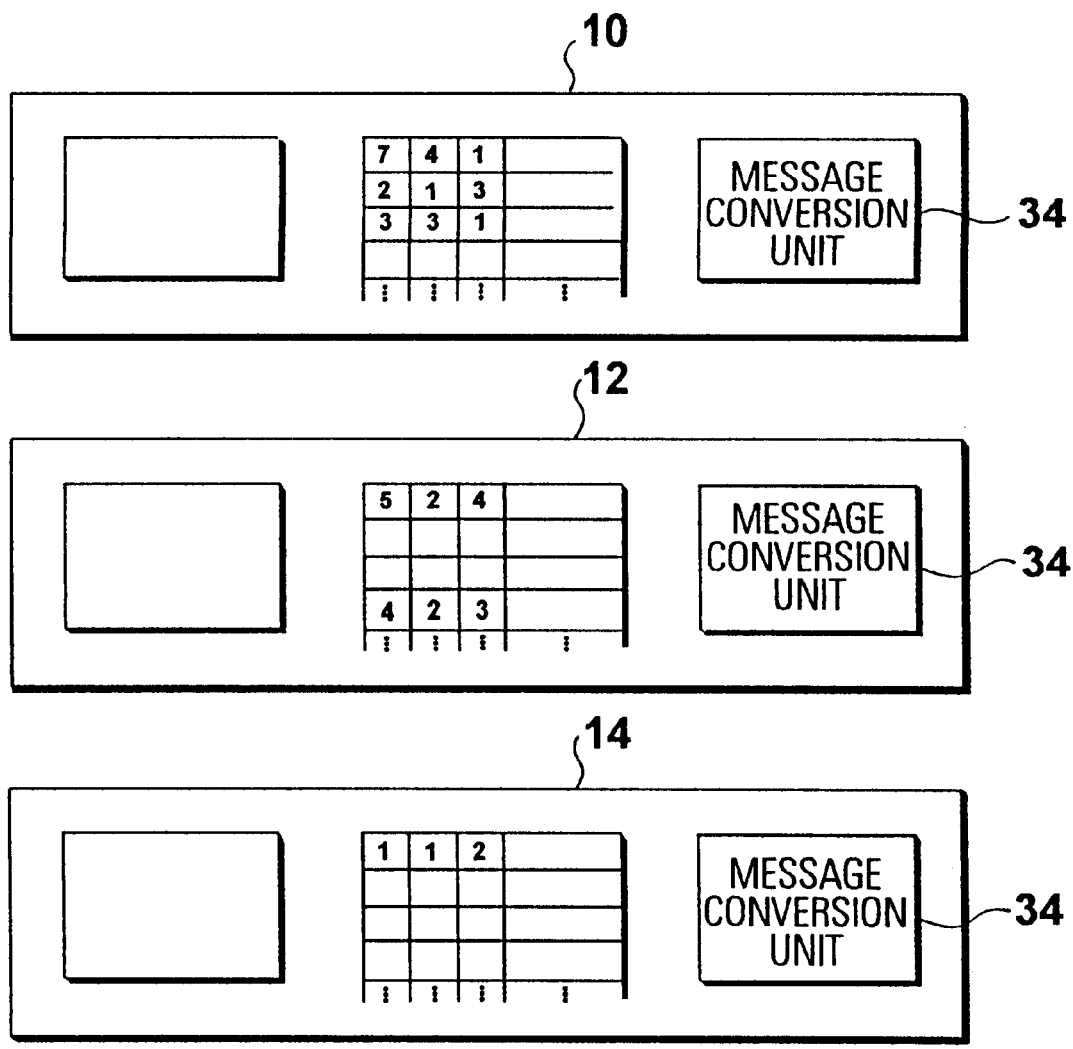
FIG. 12 shows the application of the message conversion unit to different system application units in a dedicated manner according to the present invention.

As shown in FIG. 12, a first option is to assign to each component 10, 12, 14 of a software processing system a dedicated message conversion apparatus that enables the conversion of messages to be processed by each single component 10, 12, 14, respectively.

Figure 13:
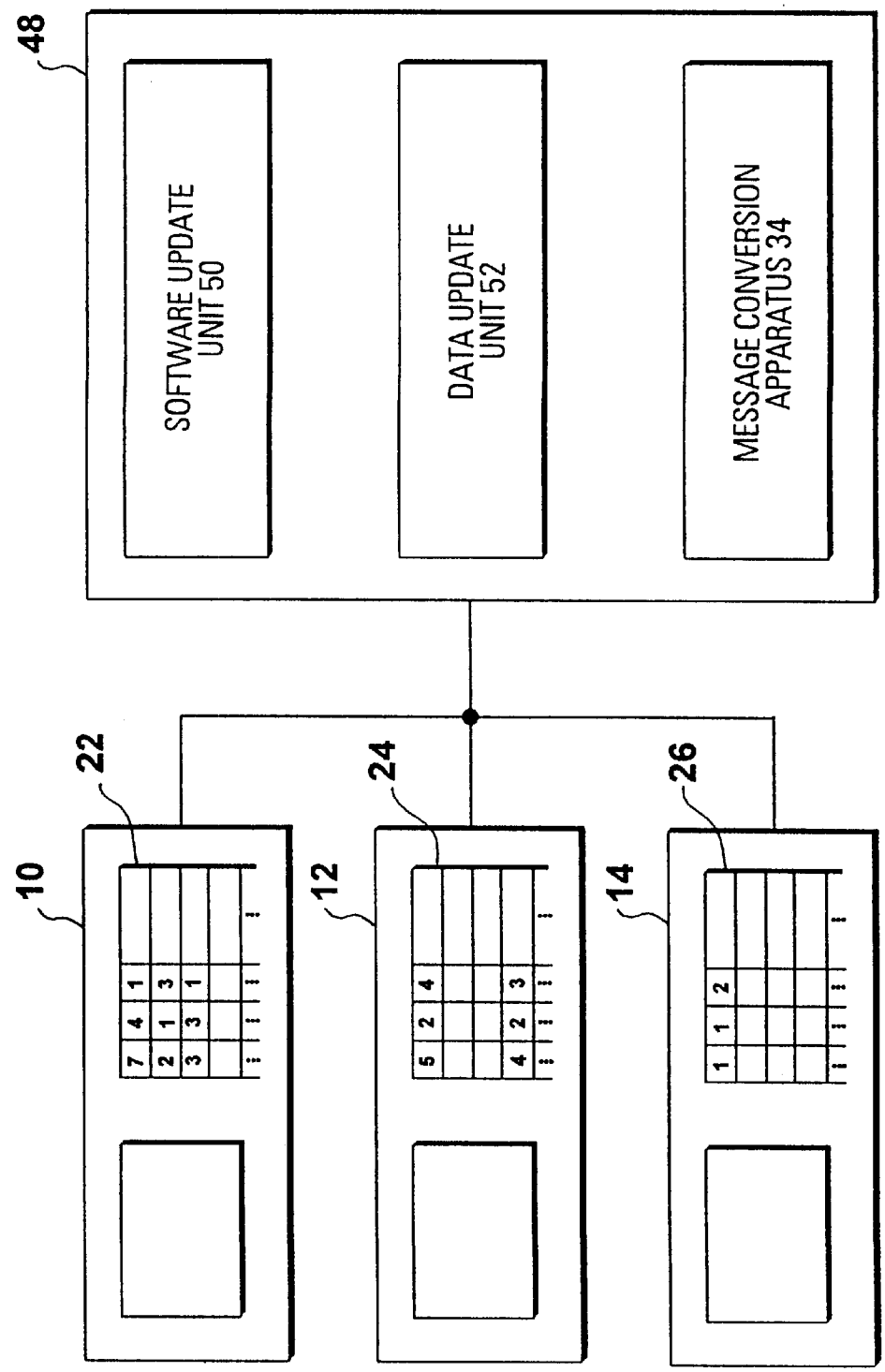
FIG. 13 shows the application of the message conversion unit according to the present invention to a plurality of application units of a system in a shared manner.

FIG. 13 shows a further option wherein again the system components are provided as explained with respect to FIG. 5 but do not contain a dedicated message conversion apparatus. To the contrary, they share a common system upgrade apparatus 48. This system upgrade apparatus 48 may comprise a software upgrade unit 50 adapted to install the new software units in the different system components 10, 12, 14. Also, a data upgrade unit 52 serves to modify data stored in internal data structures of the software units during the process of software installation. As soon as new software units are operated in the system components 10, 12, 14, the message conversion apparatus 34 may be activated to also adapt the messages stored in the message buffers 22, 24, 26 to the new system environment.

FIG. 14 shows another system architecture which may be classified as being of the partitioned type where each component is implemented in a redundant way with two symmetric realizations 10-a, 10-b, 12-a, 12-b, 14-a, 14-b. In this particular system environment the upgrade apparatus 48 is provided between the first partition A and the second partition B and comprises identical elements as outlined above with respect to FIG. 13.

However, it is also possible to implement the upgrade apparatus 48 in a redundant way both with the side A and the side B in the sense of FIG. 12 or 13. Typically, each partition of the side A and the side B would have a structure according to FIG. 13 and thus be fully operative during the update of the other side. Therefore, according to the present invention it is possible to clearly enhance the availability and safety of the overall system and also to increase the performance during software upgrade.

This specific architecture is well adapted to the inventive system upgrade method for the upgrade of software and related data as well as corresponding messages, as will be explained in the following with respect to FIG. 15.

Figure 15A:
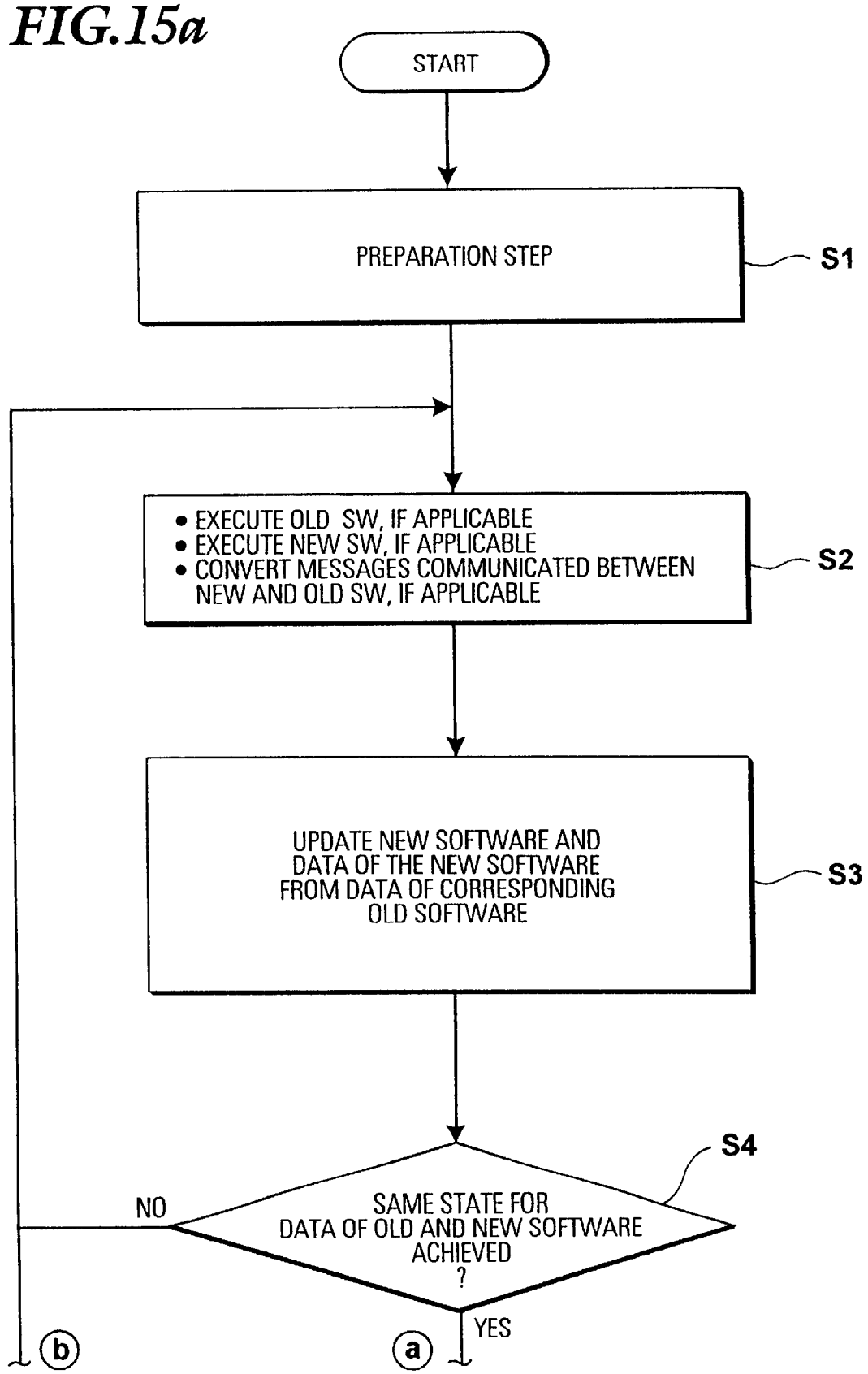
FIGS. 15(a)–15(b) show flow charts according to the inventive method for data and message conversion during the upgrade of a system according to the present invention.
Figure 15B:
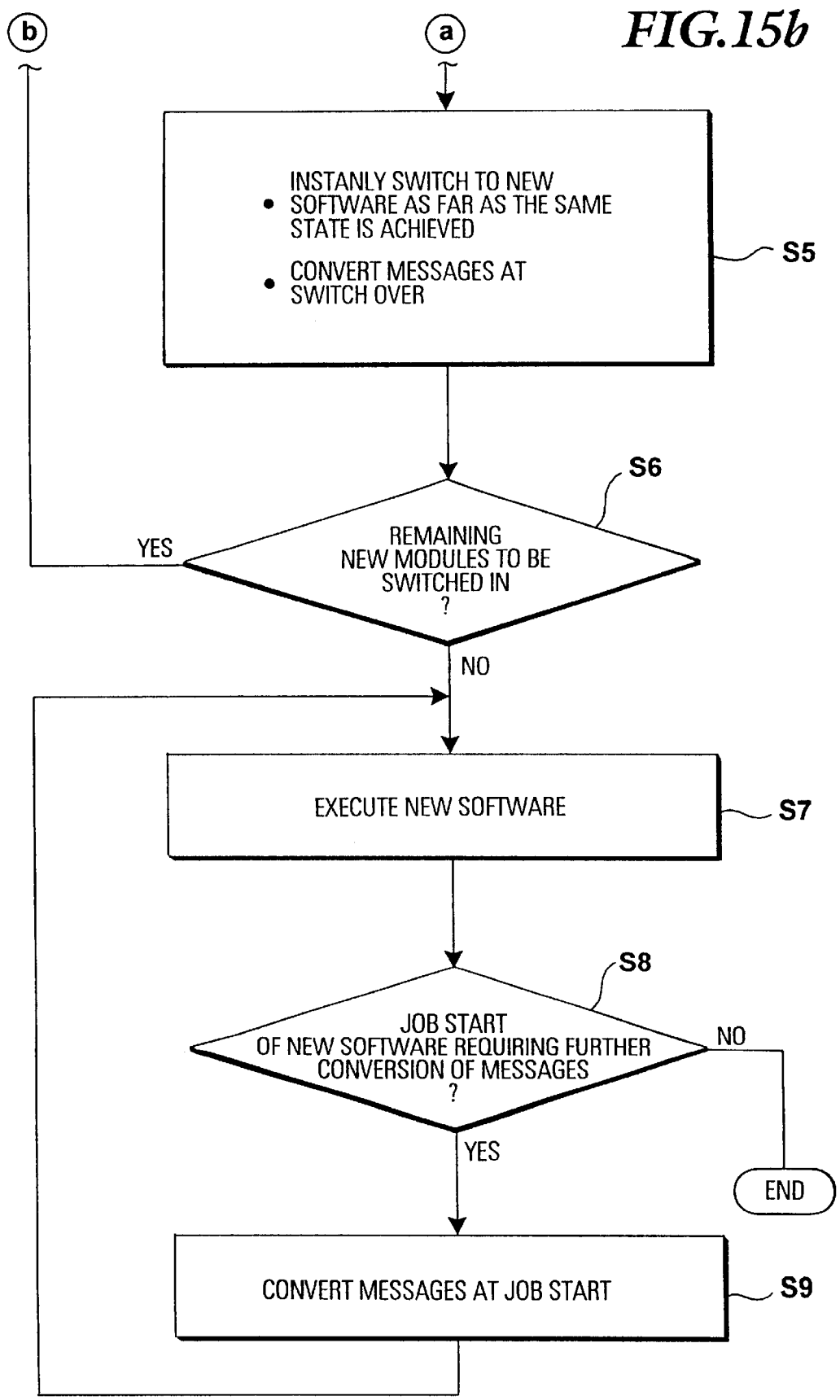

As shown in FIG. 15 the inventive method starts with a preparation step S1 to load new software and carry out the initialization thereof. Further, according to step S2 the execution of old software is continued during the complete upgrade of software and data related thereto. Concurrently with the execution of the old software in step S2 new software and related data are upgraded in step S3. This concurrent execution of different steps S2 and S3 allows for a significant improvement of the overall system efficiency during the inventive upgrade process.

As shown in FIG. 15, as soon as the state of old software and new software is evaluated to be consistent in step S4 switch over to new software is executed in step S5. This step S5 may operate per group of new and old software units or for all software units in one group.

Further, during step S5 message being stored in the different message buffers 22, 24, 26 shown in FIG. 5 and FIGS. 12 to 14 may also be converted according to the procedure outlined above. In case these messages are instantly converted during switch over, no further delay will occur on job start in new software units.

After each switching step S5 there follows a step S6 to evaluate if relevant software or data to be upgraded remains in the system. If this is the case, the upgrade process returns to step S2 to further continue with the upgrade of additional software units and related data until the complete upgrade process is finished. In this case, one may have a situation where old and new software modules execute simultaneously in the same system. Thus, it may be necessary to convert messages communicated between new and old software as outlined above and indicated in step S2. This conversion could preferably be activated on demand at job start, just before the beginning of the processing of an individual message in the receiving software processing unit.

Otherwise, the system operation continues with step S7 where only the new software units are operated in the upgraded system. Here, a situation may arise where at job start of a new software unit messages received thereby are not converted, which will be evaluated in step S8. In such a case the inventive message conversion apparatus 34 will be activated on demand according to step S9. Afterwards the execution of new software is continued after a loop back to step S7.

FIG. 16 shows a communication system exchange as first example for the application of the present invention for which the underlying structure is described, e.g., in Ericsson Review No. 3, 1995. Here, a central processor 54 handles call related events and other data communication processes in the communication system. Further, regional processors 56, 58, 60 handle the signaling to and from the end users in the communication system. As shown in FIG. 16, a regional processor handler 62 coordinates the exchange of the signals between the regional processors 56, 58, 60 and the central processor 54. To handle time critical events, a job buffer 64 enables the buffering of messages exchanged in the sense outlined above.

For such a communication system the upgrade could be carried out in the central processor 54 which may be, e.g., of a type with two partitions to support the upgrade process. A particular impact of the present invention for such an application would be that the overall system downtime during a system upgrade is minimized to avoid any loss of revenues for the system provider. Therefore, it is possible to flexibly upgrade the communication system more often than with the conventional software upgrade process requiring full shut down of the system.

Figure 17:
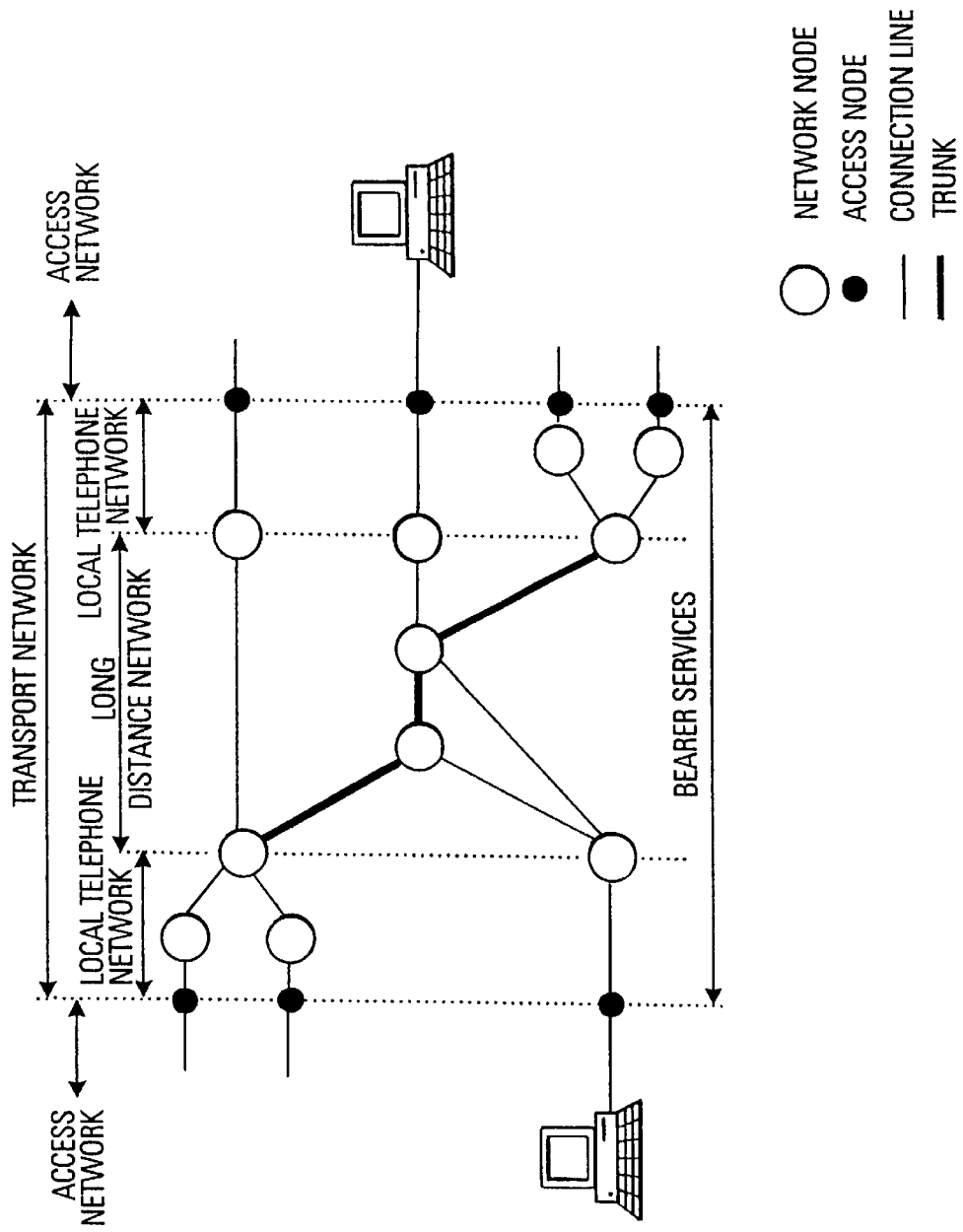
FIG. 17 shows the implementation of a wide area network as further typical example for the application of the present invention.

FIG. 17 shows a distributed communication network as second example for the application of the present invention. Here, components of the distributed communication network are the access network, the local telephone network, and the long distance network, respectively. The local telephone network and the long distance network constitute the transport network for bearer services.

Nodes in this communication network are either network nodes or access nodes. The long distance network uses trunks for the exchange of messages. Further, connection lines are provided in the communication network for the exchange of information through the network.

From the above, it immediately follows that any software unit that may either reside at a network node, an access node or the end terminal may be upgraded using the inventive approach by simultaneously minimizing a disturbance of the communication network.

Typical examples for such communication networks would be an ATM network, where the messages would be related to ATM cells, call center related structures, FDDI applications or frame relays applications, respectively. Also, the present invention could clearly be applied to the GSM infrastructure or the internet where related software could be operated by internet service providers.

Further, besides the software upgrade in the network nodes the present invention could also be used in case the protocol of the exchange of data and signals in such a network is upgraded.

LIST OF REFERENCE NUMERALS

(10) system component
(12) system component
(14) system component
(16) application unit
(18) application unit
(20) application unit
(22) message buffer
(24) message buffer
(26) message buffer
(28) connection
(30) connection
(32) connection
(34) message conversion apparatus
(36) message conversion information interface unit
(38) message control information processing unit
(40) message data processing unit
(42) table storing unit
(44) information access unit
(46) conversion handling unit
(48) system upgrade apparatus
(50) software upgrade unit
(52) data upgrade unit
(54) central processor
(56) regional processor
(58) regional processor
(60) regional processor
(62) regional processor handler
(64) job buffer

What is claimed is:

1. Message conversion apparatus (34), comprising:
   a) an interface means (36) for message conversion information (MCI) describing at least one message being exchanged in a software processing system before and after an upgrade of the software processing system; and
   b) a message conversion means (38, 40) adapted to convert the at least one message between old and new representation for the software processing system in compliance with the specifications given in the message conversion information (MCI).

2. Message conversion apparatus according to claim 1, wherein the message conversion means (38, 40) is activated upon switch over to the upgraded software processing system.

3. Message conversion apparatus according to claim 1, wherein the message conversion means (38, 40) is activated on demand upon job start of message receiving new software in the software processing system.

4. Message conversion apparatus (34), comprising:
   a) an interface means (36) for message conversion information (MCI) describing at least one message, being exchanged in a software processing system before and after an upgrade of the software processing system; and
   b) a message conversion means (38, 40) adapted to convert the at least one message between old and new representation for the software processing system in compliance with the specifications given in the message conversion information (MCI); wherein
      the message conversion means (38) is activated on demand upon job start of message receiving old software in the software processing system.

5. Message conversion apparatus according to claim 4, wherein the message conversion means (38, 40) is further activated upon switch over to the upgraded software processing system.

6. Message conversion apparatus according to claim 4, wherein the message conversion means (38, 40) is further activated on demand upon job start of message receiving new software in the software processing system.

7. Message conversion apparatus (34), comprising:
   a) an interface means (36) for message conversion information (MCI) describing at least one message being exchanged in a software processing system before and after an upgrade of the software processing system; and
   b) a message conversion means (38, 40) adapted to convert the at least one message between old and new representation for the software processing system in compliance with the specifications given in the message conversion information (MCI); wherein
   the message conversion means (38, 40) comprises
      a message control information processing means (38) to convert a message control information part comprising at least one of a message reference, a message source software unit, a message target software unit, and a message class, respectively; and
      a message data processing means (40) to convert at least one data element of a-message data section (DATA).

8. Message conversion apparatus according to claim 7, wherein the message control information processing means (38) subdivides into:
   a) a table storing means (42) storing conversion related parts with respect to message control information;
   b) an information access means (44) adapted to enable the access to information stored in the table storing means (42) in dependence on information supplied with respect to a message to be converted;
   c) a conversion handling means (4) adapted to implement the conversion of messages according to information provided through the information access means (44) and the message to be converted.

9. Message conversion apparatus according to claim 7, wherein the message control information processing means (38) and the message data processing means (40) execute the conversion of received messages using functional relationships.

10. Message conversion apparatus according to claim 7, wherein the message control information processing means (38) is adapted to convert a message identity according to $$\text{New\_SUID.MESSAGEx} = \text{Old\_SUID.MESSAGEy} \tag{7a}$$

11. Message conversion apparatus according to claim 7, wherein the message control information processing means (3) is adapted to convert a SU_reference according to $$\text{New\_SUID} = \text{Old\_SUID} \tag{8a}$$

12. Message conversion apparatus according to claim 7, wherein the message control information processing means (38) is adapted to convert a message reference according to $$\text{New\_SUID} = \text{Old\_SUID} \tag{9a}$$

13. Message conversion apparatus according to claim 7, wherein the message control information processing means (38) is adapted to terminate a message according to $$\text{TERMINATE SUID.MESSAGEx} \tag{10a}$$

14. Message conversion apparatus according to claim 7, wherein the message control information processing means (38) is adapted to initialize a message according to $$\text{INITIATE SUID.MESSAGEx [WITH data1, data2, ...]} \tag{11a}$$

15. Software processing system according to claim 14, which comprises two logic partitions (10-a, 10-b, 12-a, 12-b, 14-a, 14-b) with a dedicated message conversion apparatus (34) for each logic partition.

16. Message conversion apparatus according to claim 7, wherein the message data processing means (40) is adapted to change message data according to $$\text{SUIDx.MESSAGEy.DATAm} = \text{expression (SUIDz.MESSAGE u.DATAi, SUIDv.MESSAGEw.DATAk, ... constant1, constant2, ...)} \tag{12a}$$

where the right hand side expression may contain operators of arithmetic and logic type, operating on specified data variables and constants.

17. Software processing system of a type with upgrade functionality, comprising:
   a) at least one message buffer (22, 24, 26) storing messages to be processed by the software processing system;
   b) at least one application unit (16, 18, 20) processing messages stored in the at least one message buffer; and
   c) a message conversion apparatus (34) adapted to convert messages between old and new representation after an upgrade of the at least one application unit (16, 18, 20), wherein said message conversion apparatus comprises
      1) an interface means (36) for message conversion information (MCI) describing at least one message being exchanged in a software processing system before and after an upgrade of the software processing system; and
      2) a message conversion means (38, 40) adapted to convert the at least one message between old and new representation for the software processing system in compliance with the specifications given in the message conversion information (MCI).

18. Software processing system according to claim 17, which is of a distributed type with a plurality of application units (16, 18, 20) each being connected to a conversion apparatus (34).

19. Software processing system according to claim 17, which is of a distributed type with a plurality of application units (16, 18, 20) being connected to a common conversion apparatus (34).

20. Software processing system according to claim 17, which comprises two logic partitions (10-a, 10-b, 12-a, 12-b, 14-a, 14-b) being connected to a common message conversion apparatus (34).

21. System upgrade method for a computation system with at least two logic partitions, comprising the steps:
   a) upgrading a state of new software (S3) in a standby partition means to the state of old software in an executing partition means while continuing execution of the old software;
   b) switching to the execution of new software (S5) as far as the same state is achieved for the standby partition means and the executing partition means; and
   c) conversion of messages (S2, S5, S8) transmitted between different software modules in the computation system to a format suitable for new receiving software either at switch over to the execution of receiving new software or on demand at job start of receiving new software, or
   conversion of messages (S2, S5, S8) transmitted between different software modules in the commutation system to a format suitable for old receiving software either at switch over to the execution of old receiving software or on demand at job start of the old receiving software.

22. System upgrade method according to claim 21, wherein the updating steps c) subdivide into:
   e) read message conversion information (MCI) via a related interface (36) into a message conversion apparatus (34); and
   f) convert a message into a new representation for the new software in compliance with the specifications given in the message conversion information (MCI), or convert the message into an old representation for the old software in compliance with the specifications given in the message conversion information (MCI).

23. System upgrade method according to claim 22, wherein the steps f) subdivide into:
   h) transfer messages unchanged if no message conversion information (MCI) is specified; and/or
   i) conversion of a message control information, comprising at least one of a message reference, a message source software unit, a message target software unit, and a message class, respectively; and/or
   j) conversion of at least one data element of a message data section.

24. System upgrade method according to claim 23, wherein the conversion of received messages is executed using functional relationships.

25. System upgrade method according to claim 21, wherein besides the conversion steps a special initialization step for new messages data elements is executed at switch over or start up of new software.

26. System upgrade method according to claim 21, wherein in case an error situation occurs before switch over the conversion is terminated and the execution of the old software in the execution partition means is continued.

27. System upgrade method according to claim 21, wherein a switch back step is performed such that the executing partition means with the old software becomes again the executive partition means in case an error during execution of the new software occurs after switch over.

28. System upgrade method for a computation system with at least two logic partitions, comprising the steps:
   a) upgrading a state of new software (S3) in a standby partition means to the state of old software in an executing partition means while continuing execution of the old software;
   b) switching to the execution of new software (S5) as far as the same state is achieved for the standby partition means and the executing partition means; and
   c) conversion of messages (S2, S5, S8) transmitted between different software modules in the computation system to a format suitable for new receiving software either at switch over to the execution of receiving new software or on demand at job start of receiving new software, or
   conversion of messages (S2, S5, S8) transmitted between different software modules in the computation system to a format suitable for old receiving software either at switch over to the execution of old receiving software or on demand at job start of the old receiving software; wherein
   either of the conversion steps is executed in parallel and without disturbance of the old software running in the executing partition means.

29. System upgrade method for a computation system with at least two logic partitions, comprising the steps:
   a) upgrading a state of new software (S3) in a standby partition means to the state of old software in an executing partition means while continuing execution of the old software;
   b) switching to the execution of new software (S5) as far as the same state is achieved for the standby partition means and the executing partition means; and
   c) conversion of messages (S2, S5, S8) transmitted between different software modules in the computation system to a format suitable for new receiving software either at switch over to the execution of receiving new software or on demand at job start of receiving new software, or
   conversion of messages (S2, S5, S8) transmitted between different software modules in the computation system to a format suitable for old receiving software either at switch over to the execution of old receiving software or on demand at job start of the old receiving software; wherein
   either of the conversion steps is executed repeatedly as background process until the switching to new software is finished to keep track of the changing state in the executing partition means.

* * * * *